United States Patent [19]

Matsumoto et al.

[11] Patent Number: 4,846,018
[45] Date of Patent: Jul. 11, 1989

[54] ARTICULATION DRIVE APPARATUS OF INDUSTRIAL ROBOT

[75] Inventors: Kazuyuki Matsumoto, Ogaki; Masataka Hashimoto; Michiyoshi Iwata, both of Fuwa, all of Japan

[73] Assignee: Teijin Seiki Co., Ltd., Osaka, Japan

[21] Appl. No.: 945,577

[22] PCT Filed: Mar. 13, 1986

[86] PCT No.: PCT/JP86/00128

§ 371 Date: Nov. 17, 1986

§ 102(e) Date: Nov. 17, 1986

[87] PCT Pub. No.: WO86/05470

PCT Pub. Date: Sep. 25, 1986

[30] Foreign Application Priority Data

Mar. 18, 1985 [JP] Japan .................. 60-53866

[51] Int. Cl.4 .......................................... F16H 1/28
[52] U.S. Cl. .................................. 74/804; 901/23; 901/28
[58] Field of Search ............. 74/804, 788, 785, 640, 74/801; 901/23, 25, 24, 28

[56] References Cited

U.S. PATENT DOCUMENTS

| | | | |
|---|---|---|---|
| 4,348,918 | 9/1982 | Fukui | 74/804 X |
| 4,407,170 | 10/1983 | Fukui | 74/804 X |
| 4,518,308 | 5/1985 | Grzybowski | 74/640 X |
| 4,557,662 | 12/1985 | Terauchi et al. | 901/23 X |
| 4,574,659 | 3/1986 | Arndt | 74/804 |
| 4,594,049 | 6/1986 | Terauchi | 901/28 X |
| 4,610,598 | 9/1986 | Hamada et al. | 901/28 X |
| 4,620,831 | 11/1986 | Poncet et al. | 414/744 A |
| 4,651,591 | 3/1987 | Wurst | 74/675 |
| 4,656,891 | 4/1987 | Durand | 74/804 |
| 4,690,010 | 9/1987 | Matsumoto et al. | 74/469 |
| 4,725,191 | 2/1988 | Eberle et al. | 901/23 X |
| 4,733,576 | 3/1988 | Zimmer et al. | 74/665 L |

FOREIGN PATENT DOCUMENTS

| | | |
|---|---|---|
| 0188863 | 7/1986 | European Pat. Off. ............ 901/23 |
| 2527603 | 12/1976 | Fed. Rep. of Germany . |
| 3006331 | 9/1980 | Fed. Rep. of Germany . |
| 2449830 | 9/1980 | France . |
| 55-112450 | 8/1980 | Japan . |
| 56-152594 | 11/1981 | Japan . |
| 57-16714 | 4/1982 | Japan . |
| 58-211881 | 12/1983 | Japan . |
| 59-24283 | 2/1984 | Japan . |
| 59-115189 | 7/1984 | Japan . |
| 59-121255 | 7/1984 | Japan . |
| 59-175986 | 10/1984 | Japan . |
| 647054 | 12/1984 | Switzerland . |
| 2047381 | 11/1980 | United Kingdom . |

Primary Examiner—Dirk Wright
Attorney, Agent, or Firm—Cushman, Darby & Cushman

[57] ABSTRACT

In articulation drive apparatus of an industrial robot which includes a first member (5) of the robot, a second member (12) of the robot freely rotatably supported on the first member and a reduction gear apparatus for reducing rotation of an electric motor integrally connected to the first member and transmitting the reduced rotation to the second member, the improvement wherein the reduction gear apparatus (3) comprises a primary reduction gear (20) for reducing the number of rotations of the electric motor (1) and a secondary planetary reduction gear (21) for further reducing the number of rotations of output of the primary reduction gear (20). Resonance phenomenon of the drive system is prevented by modifying the construction of the reduction gear apparatus used in the robot drive system, and furthermore, by using bar-shaped members (60), the robot is made small and light in weight and stands a relatively larger torsional rigidity.

10 Claims, 13 Drawing Sheets

ARTICULATION DRIVE APPARATUS OF INDUSTRIAL ROBOT

DESCRIPTION

1. TECHNICAL FIELD

The present invention relates to an articulation drive apparatus of an industrial robot and in particular to an improved articulation drive apparatus which prevents occurrence of resonance vibration of the robot drive system.

2. BACKGROUND ART

In industrial robots, in general, an electric servo motor or electric pulse motor having a characteristic of high speeds and low torques, and a reduction gear apparatus for converting the output of the electric motor into low speeds and high torques have been employed in the drive system of articulated portions of robot arms and the like in order to obtain output torque suitable for operation.

Also, such a reduction gear apparatus is required to have a large reduction gear ratio of the order of 1/120 and a small backlash and be light in weight to minimize influence of force of inertia.

A conventional reduction gear apparatus which meets such requirements is described, for example, as a harmonic gear apparatus (trade name: harmonic drive) in Japanese Laid-open Publication No. 59-175986 and as a planetary differential gear of the eccentric-rotation type in Japanese Laid-open Publication No. 59-106744. In general, the former reduction gear ratio is in the range of between about 1/80 and about 1/320, and the latter reduction gear ratio is in the range of between about 1/6 and about 1/200. Also, the former harmonic gear apparatus is smaller in diameter per reduction gear ratio and lighter in weight per reduction gear ratio than the latter, and at the same time has a reduction gear ratio and mechanical strength which are required of a reduction gear apparatus for driving articulated portions of most robot arms. Harmonic gear apparatuses are therefore employed widely as a reduction gear apparatus for driving articulated portions of robot arms. In rare case, when a large reduction gear ratio which cannot be obtained by the harmonic gear apparatus is required of the reduction gear apparatus, for example, when a large reduction gear ratio of the order of 1/625 is required in the case that a motor of the small capacity and high rotation type (for example, the output is less than 1000 watt and the number of rotations is 5000 rpm) is used to drive robot arms, the harmonic gear apparatus has been used in cooperation with a primary reduction gear apparatus as shown in Japanese Laid-open Publication No. 56-152594.

However, in the case the above-noted reduction gear apparatuses are each employed in the articulation drive apparatus of the robot, difficulties were involved in that torsional resonance of the reduction gear and the robot arms, etc. occurred at the region in which the number of rotations of the electric motor, which is inputted to the reduction gear apparatus, is low. Torsional phenomenon is produced frequently in the vicinity of articulated portions of robot arms as a resonance phenomenon, so that the end portions of the robot arms cannot be positioned as desired. It had been considered that the reason why the resonance occurs was that, since the rigidity of each of the above-noted reduction gear apparatuses, which are torque transmission mechanism of the electric motor, is relatively small, the natural or characteristic torsional frequency $f_o$ of the drive system including such a reduction gear apparatus (the system comprising an electric motor, a reduction gear apparatus and robot arms) becomes small, and therefore, the vibration frequency of the reduction gear apparatus which is caused to vibrate by error of gear cutting, etc. becomes equal to the above noted natural torsional frequency $f_o$ at the region in which the number of rotations of the electric motor is low.

In regard to these problems, in Japanese Laid-open Publication No. 58-211881 there has been proposed an electrical control method which varies a command signal indicative of speed of the electric motor so that the vibration produced is eliminated. However, in this method, the system becomes unstable if the feed back gain is increased. In particular, in a robot drive system in which the rigidity of the robot is small, as the increased gain causes the apparatus to vibrate easily, the gain cannot be increased. Therefore, the sufficient effect of elimination of the vibration cannot be obtained. Also, in Japanese Laid-open Publication No. 59-175986, there has been proposed a method wherein a reduction gear is driven by a timing belt to which high tension is applied and the vibration is absorbed by the timing belt. However, in this method, there is a danger that the timing belt breaks. Also, in Japanese Laid-open Publication No. 59-115189 has there been proposed a method in which a damping apparatus comprising a spring and a weight is connected to the main shaft of a reduction gear. But, in this method, difficulties are involved in that the damping apparatus is damaged by centrifugal force and in that the weight, etc., must be adjusted in accordance with the load of the robot. Furthermore, these methods become structurally complex, and the number of parts becomes large.

It is, accordingly, an important object of the present invention to provide an articulation drive apparatus of an industrial robot by which the resonance phenomenon is transferred outside the normal operational region and which is structurally simple.

The inventors made various investigations and experiments with respect to the relation between resonance phenomenon and the spring constant, natural torsional frequency, torque fluctuation, etc. of the reduction gear which is used in the articulation drive apparatus of robot arms.

First of all, the inventors calculated whether the natural torsional frequency $f_o$ of the drive system of the robot can be transferred or not outside the range of the normal operational region of the electric motor by using in the articulation drive apparatus of the robot arm a reduction gear having a rotational spring constant Kl (FIG. 8) which is high in the vicinity of the neutral position (a so-called lost motion position). But, since the rotational spring constant Kl in the vicinity of the neutral position of the reduction gear is at most 1/10 to 1/5 of the rotational spring constant Kr of the robot arm itself, the spring constant $K = Kl \cdot Kr/(Kl + Kr)$ of the drive system itself cannot be much increased, so that the natural torsional frequency $f_o = \frac{1}{2}\pi \sqrt{K/J}$ (wherein the J indicates moment of inertia of the drive system) of the drive system also cannot be much increased. It has therefore been concluded that the natural torsional frequency $f_o$ of the drive system cannot be transferred outside the range of the normal operational region of the electric motor by increasing the spring constant Kl in the vicinity of the neutral position of the reduction gear, that is to say, by increasing the rigidity.

Hence, the inventors attempted eliminating torque fluctuation of the reduction gear which causes occurrence of vibration. That is to say, by using a planetary reduction gear of the eccentric-rotation type, the teeth of the internal and external gears of the planetary reduction gear were finished with high accuracy so that the torque fluctuation is eliminated or prevented, and at the same time annular grooves were formed in the bearing portions of eccentric input shafts and in the shaft support portions of torque pickup pins, and rubber rings were fitted in the annular grooves so that the torque fluctuation is absorbed even if occurred. However, it has been found that such attempt cannot prevent the resonance in the normal operational region of the electric motor and moreover the number of rotations of the electric motor at which the resonance occurs does not change as compared with the case the attempt is not made.

From these experimental results, it has been concluded that a reduction gear of a fixed mechanism has a corresponding characteristic of torque fluctuation, that is to say, a corresponding characteristic of frequency with respect to the drive system of the robot which causes the vibration of the robot arm. Also, from the conclusion, various experiments were made on the hypothesis that the characteristic of torque fluctuation can be transferred outside the normal operational region by changing and modifying the mechanism of a reduction gear apparatus incorporated into the robot drive system.

Although these experiments and results will be hereinafter described, the hypothesis was substantiated by the experimental results, and the following conclusion was found.

The resonance phenomenon can be transferred outside the operational range of the electric motor by providing an arrangement which is novel and common sense. The novel arrangement is that, although the difference of teeth between the internal and external gears of a planetary reduction gear of the eccentric-rotation type is one and the reduction gear ratio of the planetary reduction gear is capable of being reduced to about 1/200, in addition to this planetary reduction gear a primary reduction gear having a predetermined reduction gear ratio is provided purposely to obtain a reduction gear ratio required of a reduction gear apparatus incorporated into the drive system of the robot arms.

It should be noted that a reduction gear apparatus, in which a primary reduction gear is connected to a planetary reduction gear of the eccentric-rotation type is used in crawler vehicles as disclosed in the U.S. Pat. No. 4,348,918. However, in the crawler vehicles, the weight, backlash and the like of the reduction gear are not an important problem. Therefore, the primary reduction gear is provided only in order to modify easily the total reduction ratio of the reduction gear or only in order to obtain a low speed and high torque. On the other hand, in the robot which requires high accuracy of position, high efficiency of operation, etc. and in which the rigidity of the overall construction is small, it is very important to decrease the weight of the reduction gear and minimize the backlash. For this reason, it would not be practical to provide in the articulated portions a planetary reduction gear which is heavier in weight per reduction gear ratio than a harmonic gear apparatus, and furthermore a primary reduction gear which results in increase in weight and backlash.

To achieve the aforementioned object, the inventors have further made various investigations and experiments, and found the present invention comprising the following construction.

DISCLOSURE OF INVENTION

An articulation drive apparatus of an industrial robot comprising a first member of the robot, a second member of the robot freely rotatably supported on the first member and a reduction gear apparatus for reducing rotation of an electric motor integrally connected to the first member and transmitting the reduced rotation to the second member, the reduction gear apparatus comprising primary reduction gear having a predetermined reduction ratio $i_1$ for reducing the number of rotations of the electric motor and a secondary planetary reduction gear having a predetermined reduction ratio $i_2$ for further reducing the number of rotations of output of the primary reduction gear, the planetary reduction gear comprising eccentric input shafts to which output of the primary reduction gear is inputted, an external gear engaging with the eccentric input shafts and driven to eccentrically rotate by the rotation of the eccentric input shafts, an internal gear meshing with the external gear and having more teeth than the external gear by one and a pair of flanges arranged in opposite sides of the external gear and supporting the eccentric input shafts, the second member and the flange adjacent the second member being connected by a pin inserted from a bore formed in said flange adjacent the electric motor and a bore formed in the external gear, the secondary reduction gear and the second member being connected by a bolt passing through the pair of flanges, a total reduction ratio of the primary and secondary reduction gears being in the range of $1/60 > i_1 \times i_2 > 1/200$.

In accordance with the aforementioned articulation drive apparatus of the industrial robot, the reduction gear apparatus comprises a primary reduction gear for reducing the number of rotations of the electric motor and a secondary planetary reduction gear for further reducing the number of rotations of output of the primary reduction gear, the planetary reduction gear comprising eccentric input shafts to which output of the primary reduction gear is inputted, an external gear engaging with the eccentric input shafts and driven to eccentrically rotate by the rotation of the eccentric input shafts, an internal gear meshing with the external gear and having more teeth than the external gear by one. This reduction gear is incorporated in the drive system of the robot. Thus, the resonance phenomenon of the drive system is transferred outside the normal operational region.

Also, one of the first and second members and the pair of flanges are connected by bar-shaped members passing through bores formed in the external gear, and therefore the construction is simple and the assembly and disassembly is easy. Since the internal space of the reduction gear apparatus can be effectively used, the reduction gear apparatus is small and light in weight. In addition, the reduction gear are held in fast assembled relationship by bar-shaped members, so that the torsional rigidity of the reduction gear becomes large. The reduction gear apparatus therefore can stand larger load.

BRIEF DESCRIPTION OF DRAWINGS

FIG. 1 is a schematic view of the overall arrangement and construction of the first embodiment, FIG. 2 is a cross sectional view, partly broken away, showing a reduction gear apparatus shown in FIG. 1, FIG. 3 (a) is a cross sectional view substantially taken along line IIIa—IIIa shown in FIG. 2, FIG. 3 (b) is a cross sectional view substantially taken along line IIIb—IIIb shown in FIG. 3(a), FIG. 4 illustrates performances of a comparative example and the embodiment of the articulation drive apparatus of the industrial robot according to the present invention, FIG. 5 depicts an apparatus by which the vibration test results shown in FIG. 4 is obtained.

BEST MODE FOR CARRYING OUT THE INVENTION

Figure 1:
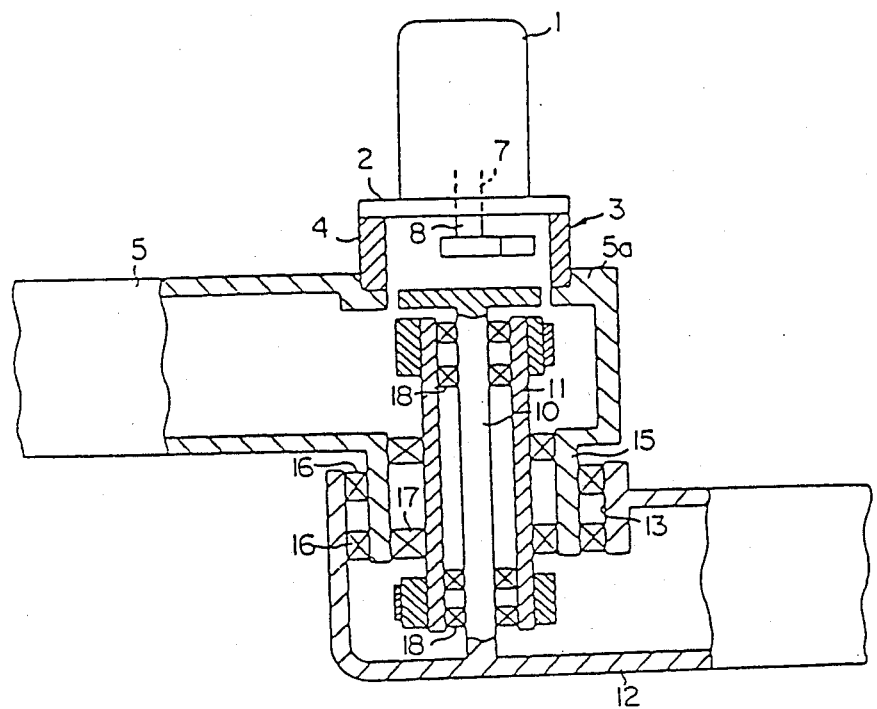
FIGS. 1 to 5 are views showing a first embodiment of an articulation drive apparatus of an industrial robot according to the invention, respectively.
Figure 2:
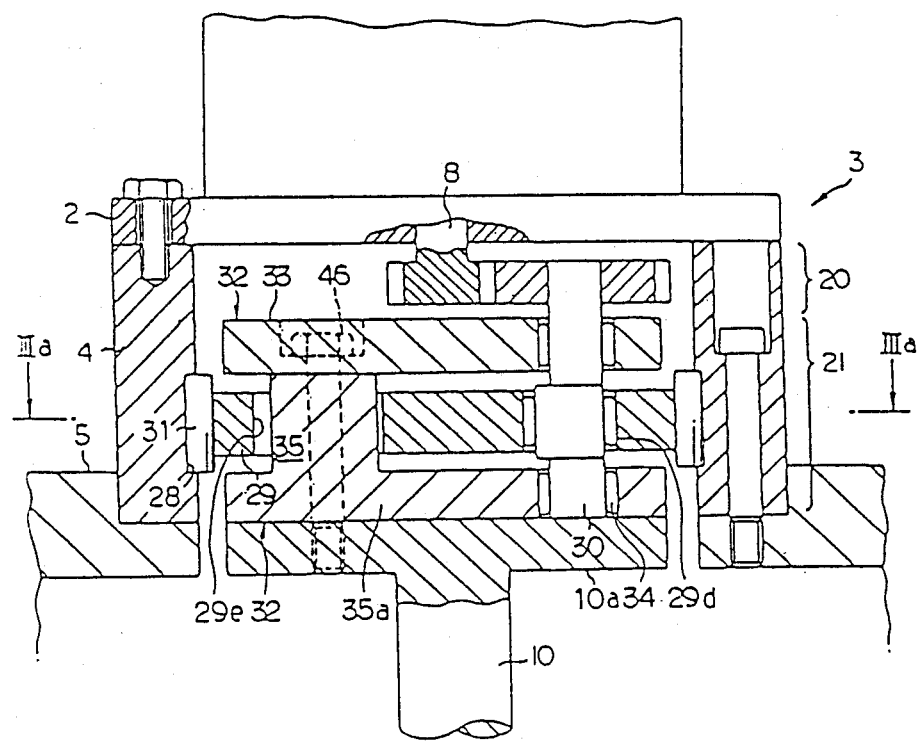
Figure 3A:
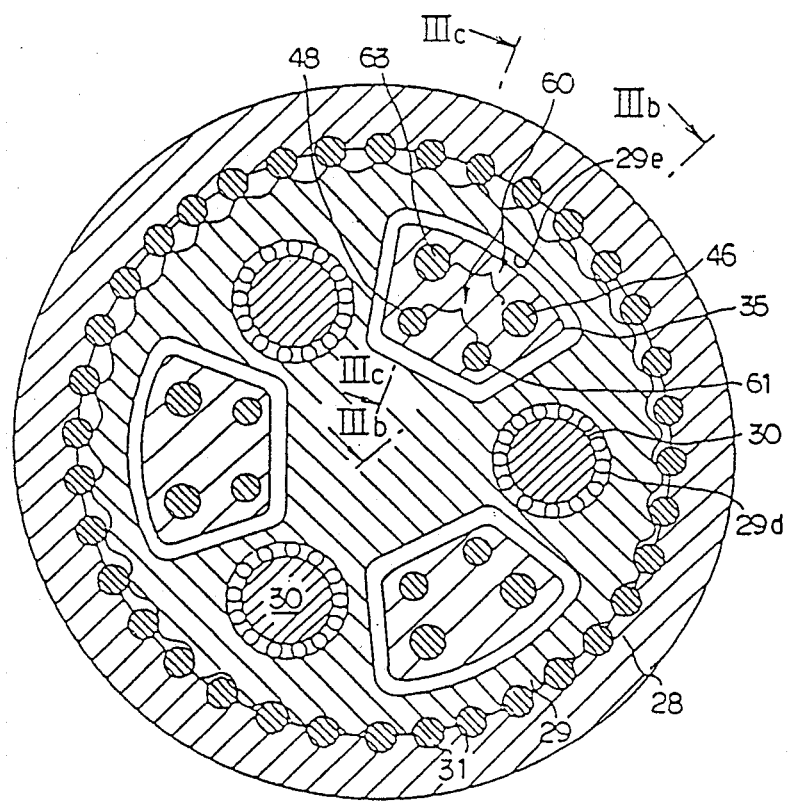
FIG. 3(c) is a cross sectional view substantially taken along line IIIc—IIIc shown in FIG. 3(a)
Figure 3:
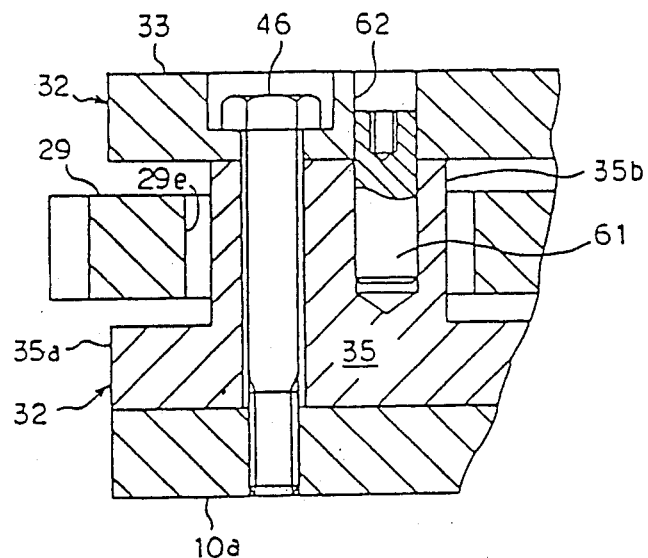
Figure 3:
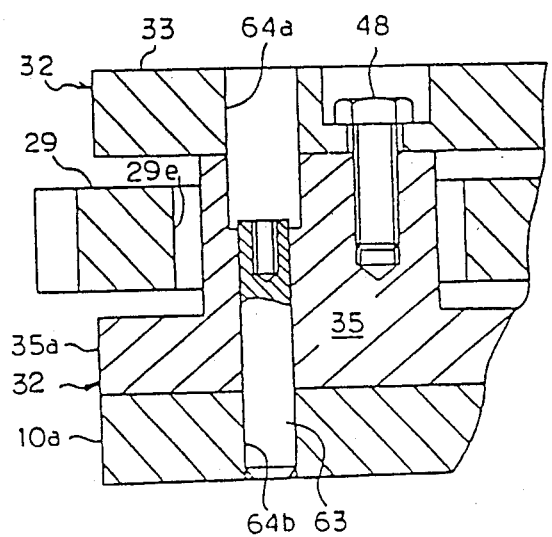

An articulation drive apparatus of an industrial robot according to the present invention will hereinafter be described in conjunction with the accompanying drawings. FIG. 1 through FIG. 3 are views showing a first embodiment of the present invention, respectively.

First of all, the construction is described. FIG. 1 is a schematic view of the articulated portion of the robot in which the articulation drive apparatus of the industrial robot according to the present invention is incorporated. Designated by reference numeral 1 is an electric motor, and a flange 2 of the electric motor 1 is secured to a cylindrical member 4 of a reduction gear apparatus 3. The cylindrical member 4 is secured to a front end portion 5a of a first arm 5 serving as a first member. An output rotational shaft 7 of the electric motor 1 is connected to an input rotational shaft 8 of the reduction gear apparatus 3, the output of the reduction gear apparatus 3 is transmitted to a shaft 10, and the shaft 10 is secured through a cylindrical member 11 to a second arm 12 serving as a second member. Between a sleeve 13 formed in the end portion of the second arm 12 and a cylindrical projection 15 projecting downwardly from the lower surface of the front end portion 5a of the first arm 5 is interposed a pair of bearings 16, and the second arm 12 is freely rotatably supported on the first arm 5. Between the inner surface of the projection 15 and the outer surface of the intermediate portion of the cylindrical member 11 is interposed a pair of bearings 17. Between the inner surfaces of the upper and lower portions of the cylindrical member 11 and the shaft 10 are interposed two pairs of bearings 18. Accordingly, the reduction gear apparatus 3 reduces the number of rotations of the electric motor 1 and drives a driven portion of the robot, that is, the second arm 12 to rotate. Also, the electric motor 1, reduction gear apparatus 3, second arm 12 and load associated with the second arm 12 constitute drive system.

The reduction gear apparatus 3, as shown in FIGS. 2 and 3, comprises a primary reduction gear 20 for reducing the number of rotations of the electric motor 1, and a secondary reduction gear 21 connected to the primary reduction gear 20 for further reducing the number of rotations. The primary reduction gear 20 is of a parallel shaft type reduction gear and comprises a spur gear. The secondary reduction gear 21 comprises a planetary reduction gear of the eccentric-rotation type which includes a fixed internal gear 28, an external gear 29 meshing with the internal gear 28, and an input crank shaft 30 engaging with the external gear 29 and serving as an eccentric shaft causing the external gear 29 to eccentrically rotate. Also, the internal gear 28 comprises a pin gear including a plurality of pin teeth 31 and has more teeth than the external gear 29 by one. On the axially opposite sides of the external gear 29 is provided a pair of flanges 32 for supporting the input crank shaft 30. That is to say, the pair of flanges 32 comprises a circular plate portion 33 forming a front end portion of the secondary reduction gear 21 and a flange portion 35a forming a rear end portion of the secondary reduction gear 21. The flange portion 35a forms a rear end portion of a block member 35 which extends through a plurality of through bores 29e circumferentially equiangularly formed in the external gear 29, and rests on a flange portion 10a of the shaft 10. The pair of flanges 32 support a plurality of the input crank shafts 30 at their circumferential portions. In this embodiment, the input crank shafts 30 comprise three input crank shafts. Also, the external gear 29, as shown in FIG. 3(a), has a plurality of engaging portions 29d engaging with the input crank shafts 30, and is formed with the through bores 29e between these engaging portions 29d. In this embodiment, the engaging portions 29d comprises three engaging portions.

One of the first and second arms 5 and 12, and the pair of flanges 32, as shown in FIGS. 3(a), 3(b) and 3(c), are connected with each other by at least two bar members 60 passing through the through bores 29e formed in the external gear 29. In this embodiment, the flange portion 10a of the shaft 10 secured to the second arm 12 and the pair of flanges 32 are connected by four bar members consisting of two bolts 46 and 48 and two pins 61 and 63. That is to say, the bar members 60 are circumferentially arranged in the block member 35, and one of them is the bolt 46, the bolt 46 holding the flange portion 10a secured to the second arm 12 and the pair of flanges 32 in fast assembled relationship. The friction force caused by tightening of the bolt 46 stands an excess load of 150 to 200 percent of a rated torque of the reduction gear apparatus 3. The other small bolt 48 serves as fastening means to connect the circular plate portion 33 and the block member 35 together.

Also, a first taper pin 61 fits a pin bore 62 passing from the circular plate portion 33 to the front end portion 35b of the block member 35 to properly position the circular plate portion 33 and the front end portion 35b.

Also, a second taper pin 63 fits a pin bore 64b passing through the block member 35 and flange portion 10a, and communicating with a bore 64a passing from the circular plate portion 33 to the flange portion 35a of the block member 35 for inserting a tool therein when assembled and disassembled, in order to properly position the block member 35 and flange portion 10a. The shearing force of these taper pins 61 and 63 stands an excess load of 300 to 400 percent of a rated torque of the reduction gear apparatus 3.

A reduction gear ratio $i_1$ of the primary reduction gear 20 and a reduction gear ratio $i_2$ of the secondary reduction gear 21 are selected so that the resonance of the robot, that is, the first and second arms 5 and 12, and the secondary reduction gear 21 does not occur within the normal operational region of the electric motor 1. Namely, in the normal operational region of the electric motor 1, the reduction gear ratio $i_1$ of the primary reduction gear 20 is selected so that the number of rotations of the primary reduction gear 20 per second is less than a torsional oscillating frequency (a frequency in the vicinity of the natural torsional frequency $f_o$) of the drive system comprising the electric motor 1, the reduction gear apparatus 3, the second arm 12 and the load associated with the second arm 12. In this embodiment, the normal operational region of the electric motor 1 is selected to be 0 to 1000 rpm, the reduction gear ratio $i_1$ of the primary reduction gear 20 is selected to be $\frac{1}{3}$, the reduction gear ratio $i_2$ of the secondary reduction gear 21 is selected to be 1/40 and the total reduction gear ratio of the reduction gear apparatus 3 is selected to be 1/120. The natural torsional frequency $f_o$ of the above-noted drive system can be calculated back from the number of rotations of the electric motor 1 and reduction gear ratio $i_1$ of the primary reduction gear 20 at the time of peak of resonance, and a characteristic of torque fluctuation which will hereinafter be described in regard to the reduction gear apparatus 3, and in this embodiment the natural torsional frequency $f_o$ of the drive system is about 8.4 Hz.

If the reduction gear ratio $i_1$ of the primary reduction gear 20 is less than 1/5 (this means the denominator becomes large, and this is to be repeated in the following) or if the reduction gear ration $i_2$ of the secondary reduction gear 21 exceeds 1/25 (this means the denominator becomes small, and this is to be repeated in the following), it will be difficult to obtain the total reduction gear ratio i of 120 by using as the primary reduction gear 20 a reduction gear of the parallel shaft type which is structurally simple, and therefore it is structurally economically disadvantageous. Also, in the case the total reduction gear ratio of 1/120 is obtained with the reduction gear ratio $i_2$ of the secondary reduction gear 21 being less than 1/60 or with the reduction gear ratio $i_1$ of the primary reduction gear 20 exceeding 1/2, in the normal operational region of the electric motor 1, the number of rotations of the primary reduction gear 20 per second is in the vicinity of or exceeds the aforementioned natural torsional frequency $f_o$ (8.4 Hz) of the drive system, and therefore the prevention of resonance is not effective.

The operation will be hereinafter described.

When the electric motor 1 is caused to rotate within the normal operational region of 0 to 1000 rpm, the number of rotations of the primary reduction gear 20 in which the reduction gear ratio $i_1$ is $\frac{1}{3}$ becomes 0 to 333 rpm and the number of rotations of the secondary reduction gear 21 in which the reduction gear ratio $i_2$ is 1/40 becomes 0 to 8.3 rpm, and therefore the resonance phenomenon will not occur in this range. The resonance occurs outside the normal operational region, that is, when the number of rotations of the electric motor 1 is about 1500 rpm (at this time, the number of rotations of the primary reduction gear 20 is about 500 rpm (1500 rpm $\times \frac{1}{3}$ = 500 rpm) and the number of rotations of the planetary reduction gear 21 is about 12.5 rpm (1500 rpm $\times \frac{1}{3} \times$ 1/40 = 12.5 rpm)). The reason why the resonance occurs beyond the normal operational region of the electric motor 1 is not clear, but is assumed as follows in accordance with the experimental results. A planetary differential gear apparatus, wherein the difference of teeth between the internal and external gears is one as described in the aforementioned embodiment, has one torque fluctuation per one revolution of the input shaft (crank shaft 30). Accordingly, if this planetary differential gear is connected with primary reduction gear 20 having a reduction gear ratio $i_1$ of $\frac{1}{3}$, about 500 torque fluctuations per minute ($1500 \times \frac{1}{3} \times 1 = 500$) are produced when the number of rotations of the electric motor 1 is about 1500 rpm which is outside the normal operational region of the electric motor 1, and it is considered that the number of torque fluctuations becomes substantially equal to the natural frequency 8.4 Hz (500 vibrations/minute) of the drive system, thereby causing the resonance.

On the other hand, in the case of a harmonic reduction gear apparatus wherein the difference of teeth between the internal gear and the external gear is two, it is assumed from the experimental results that two torque fluctuations are produced per one revolution of the input shaft (web generator), and accordingly, if this harmonic reduction gear is connected with a primary reduction gear having a reduction gear ratio $i_1$ of $\frac{1}{3}$, about 500 torque fluctuations per minute ($750 \times \frac{1}{3} \times = 500$) are produced when the number of rotations of the electric motor 1 is about 750 rpm, and it is considered that if the natural frequency $f_o$ of the drive system is 8.4 Hz (500 vibrations/minute) as in the above-noted embodiment, the resonance will occur around 750 rpm which is within the normal operational region of the electric motor 1. In this case, since the resonance occurs when the number of torque fluctuations is about 500 per minute, it is also considered that the number of rotations of the electric motor 1 at which the resonance occurs can be raised to about 1500 rpm which is beyond the normal operational region by providing a primary reduction gear having a reduction ratio $i_1$ of about 1/6 in the harmonic reduction gear. But, since the reduction gear ratio $i_2$ of the harmonic reduction gear is about 1/80 at minimum, the total reduction gear ratio i is about 1/480 at minimum and thus not practical for use because the total reduction gear ratio i cannot meet a reduction ratio i of 1/120 generally required to an electric motor having normal operational region of 1 to 1000 rpm.

In addition, in the reduction gear apparatus 3 of the present invention, the relative arrangement between the pair of flanges 32 and the flange portion 10a of the second arm 12 is properly adjusted by two taper pins 61 and 63, and at the same time the flanges 32 and the flange portion 10a are held in fast assembled relationship by one bolt 46. Accordingly, the construction is simple and the assembly and disassembly is easily made. Also, as the through bore 29e of the external gear 29 can be made sufficiently large, the inner diameter of a bolt bore in the block member 35 passing through the through bore 29e can be made large, thereby resulting in reduction in number of bolts 46. Also, as the reduction gear apparatus 3 and the robot are connected by the bolts 46 effectively using the space formed in the interior of the reduction gear apparatus 3, it is dispensable to provide a flange and the like on the outside of the reduction gear apparatus 3 for the connection, and thus the apparatus can be made small and light. Also, as the bar member 60 not only connects the reduction gear apparatus and robot but also supports the torsional rigidity produced in the reduction gear apparatus 3 at the time of vibration, the bar member 60 can stand a large torsional rigidity.

It is noted that the vibrations of the electric motor 1 and the primary reduction gear 20 have no effect on the oscillation of the drive system. The reason is such that these vibrations are relatively small and absorbed by the secondary reduction gear 21.

(EXAMPLE)

Figure 8:
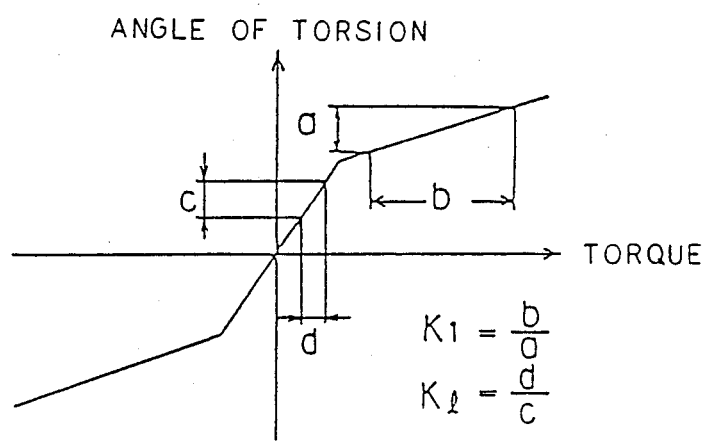
FIG. 8 shows a characteristic of a rotational spring constant of a reduction gear apparatus.

The description of vibration test will be now made in regard to the above noted embodiment of the reduction gear apparatus according to the present invention and the reduction gear apparatuses shown in comparative examples I, II and III of the following TABLE. In each of the above noted embodiment and the planetary reduction gears of the eccentric type of the comparative examples I and II, the external gears comprise two external gears spaced apart 180° in phase, which are substantially identical to the second and third embodiments described hereinafter, in order to prevent unbalance caused by eccentric rotations of the crank shaft and the external gear and minimize the amplitude of the vibration, and the internal gear has more teeth than an external gear by one. Also, the internal gear of the harmonic reduction gear has more teeth than the external gear by two. The number of reduction gears, reduction gear ratios $i_1$ and $i_2$, rotational spring constant $K_1$ (FIG. 8) and moment of inertia J of the respective reduction gear apparatuses are shown in the following TABLE. In TABLE, the planetary reduction gear indicates a planetary reduction gear of the eccentric-rotation type and the spur reduction gear indicates a spur reduction gear of the parallel shaft type.

TABLE

| Kind of reduction gear apparatus | Embodiment Spur reduction gear and planetary reduction gear | Comparative example I Spur reduction gear and planetary reduction gear | Comparative example II Planetary reduction gear | Comparative example III Harmonic reduction gear |
|---|---|---|---|---|
| Number of reduction gears | 2 | 2 | 1 | 1 |
| Primary reduction gear ratio $i_1$ | 1/3 | 1/1.5 | — | — |
| Secondary reduction gear ratio $i_2$ | 1/40 | 1/80 | 1/120 | 1/120 |
| Total reduction gear ratio i | 1/120 | 1/120 | 1/120 | 1/120 |
| Rotational spring constant $K_1$ (kg m/minute) | 37.5 | 37.5 | 22 | 17.4 |
| Moment of inertia J (kg cm/s$^2$) | 2000 | 2000 | 2000 | 2000 |
| Number of rotations of electric motor at the time of peak of resonance (rpm) | 1500 | 750 | 500 | 250 |
| Peak location (FIG. 4) of resonance | A | B | C | D |

Figure 4:
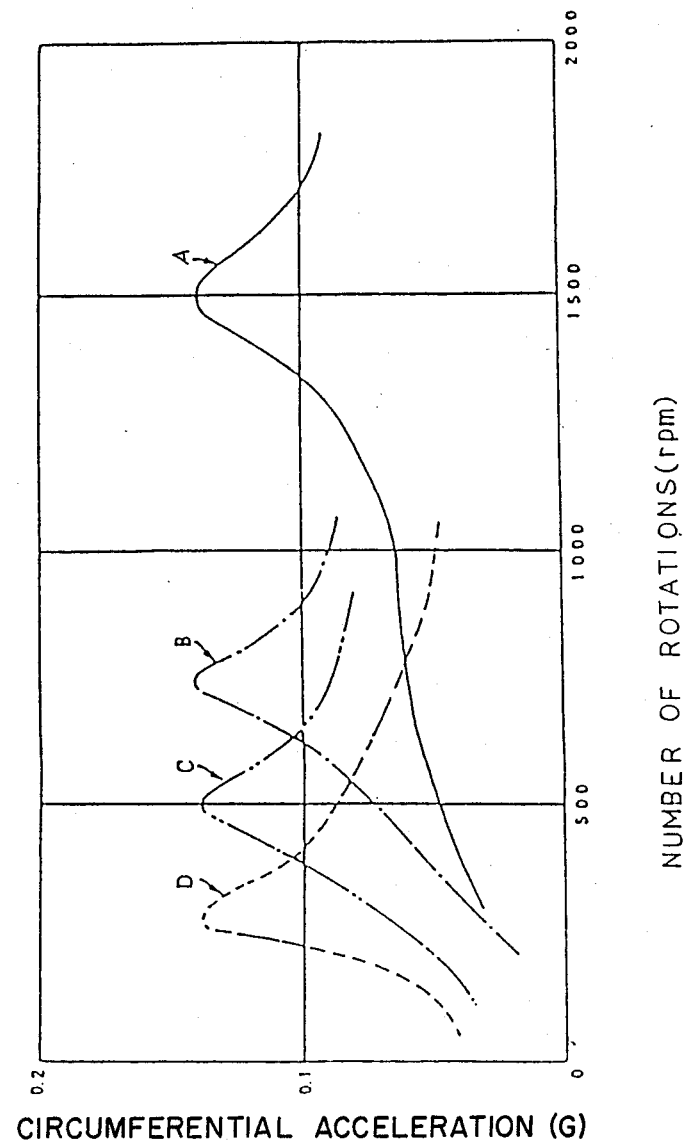
Figure 5:
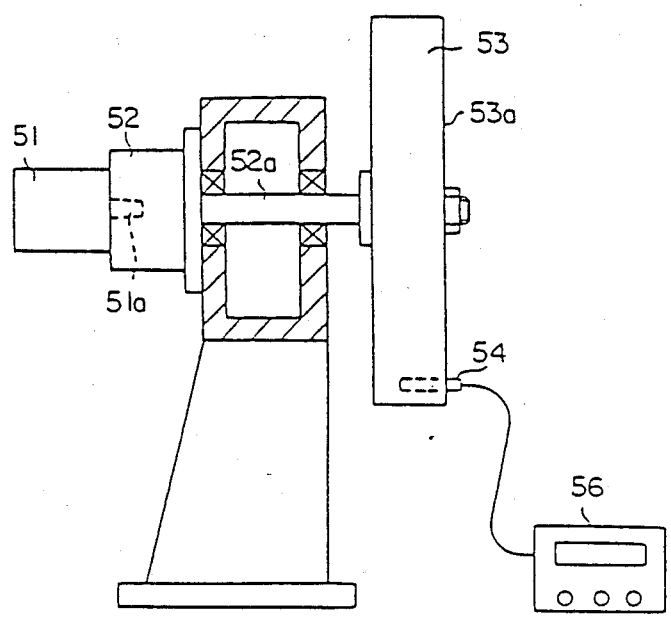

The vibration test was put into practice by the apparatus shown in FIG. 5. That is to say, an electric motor 51 is connected through its output shaft 51a to a reduction gear apparatus 52, and the reduction gear 52 is connected through its output shaft 52a with a flywheel 53 which serves as inertia load equivalent to moment of inertia J of the driven portion (the second robot arm 12) of the robot. In the peripheral end of the side surface 53a of the flywheel 53 is mounted an acceleration pick up 54 of a piezo-electric element which is adapted to measure circumferential acceleration and amplitude. The output of the acceleration pick up 54 is connected to an indicator 56. The natural frequency $f_o$ of the drive system comprising the motor 51, the reduction gear apparatus 52 and the flywheel 53 is adjusted to be about 8.4 hertz. The number of rotations of the electric motor was varied, and the acceleration of the flywheel 53 was measured. In FIG. 4 are shown the test results with the number of rotations of the electric motor 51 in rpm taken on abscissa and with circumferential acceleration, measured by the acceleration pick up 54, in G taken on the ordinate.

In the comparative examples I, II and III, peaks of the resonance occur at about 750 rpm, about 500 rpm and about 250 rpm, respectively, of the electric motor 51. The respective resonances occur within the normal operational region of the electric motor 51 ranging 1 to 1000 rpm. However, in the case of the embodiment wherein the reduction gear apparatus according to the present invention is used, the resonance occurs about 1500 rpm which is outside the normal operational region of the electric motor.

From comparison between the comparative examples II and III, it will be seen that, regarding the number of rotations of the electric motor 51 at which the resonance occurs, the planetary reduction gear wherein the difference of teeth between the internal and external gears is one, is two times the harmonic reduction gear wherein the difference of teeth between the internal and external gears is two. From comparison between the embodiment and the comparative example I, it will also be seen that the number of rotations of the electric motor 51 at which the resonance occurs is inversely proportional to the reduction gear ratio $i_1$ of the primary reduction gear.

As mentioned above, a characteristic of torque fluctuation of each reduction gear is assumed from the above-noted experimental results, and if the natural torsional frequency fo of the experimental apparatus is calculated back from such assumption, it is about 8.4 Hz in all cases. The reason is such that the resonance occurs when the rigidity of the drive system is most low, that is, when the load condition is within a so-called lost motion of the reduction gear, and the lost motion spring constants K at the time of the resonance are substantially equal with one another in the case of each of the test reduction gears.

The second embodiment of the present invention, which is an improvement of the aforementioned first embodiment, will be hereinafter described in conjunction with FIGS. 6 and 7. The portions substantially identical in construction to the first embodiment will be described with like reference numerals.

Figure 6:
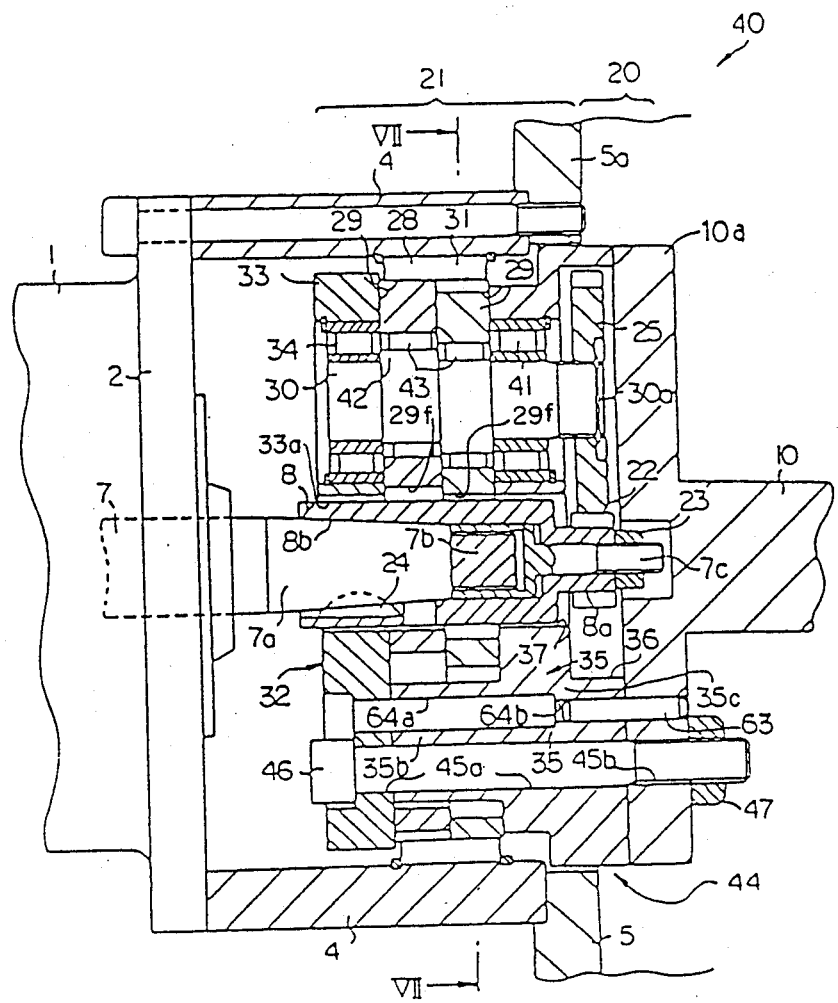
FIG. 6 is a cross sectional view, partly broken away, showing a second embodiment of the present invention.
Figure 7:
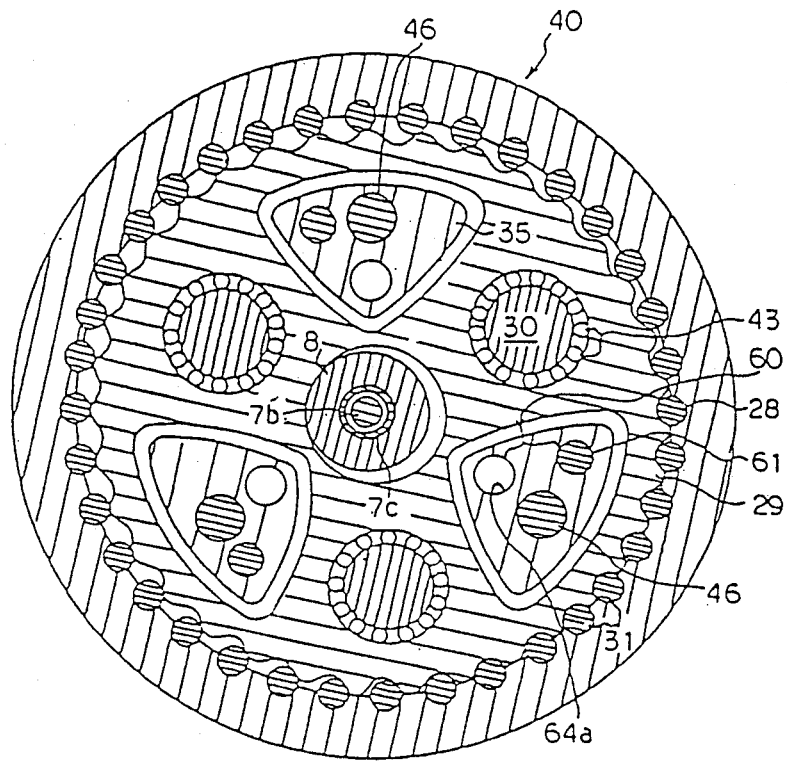
FIG. 7 is a cross sectional view substantially taken along line VII—VII shown in FIG. 6.

In FIG. 6 and FIG. 7, designated by reference numeral 40 is a reduction gear apparatus which is driven by an electric motor 1 as shown in FIG. 1, and the reduction gear apparatus 40 comprises a primary reduction gear 20 of the parallel shaft type which is connected to a rotational shaft 7 of the electric motor 1, and a secondary planetary reduction gear 21 connected to the primary reduction gear 20. A pointed end portion 7a of the rotational shaft 7 of the electric motor 1 is a tapered shaft and has a threaded portion 7b at its pointed end. A connection shaft 7c forming a part of a motor output shaft is held in mesh with the threaded portion 7b. Designated by reference numeral 8 is an input rotational shaft, and the input rotational shaft 8 has a pointed end portion 8a on which a pinion 22 of the primary reduction gear 20 is mounted. The pointed end portion 8a is formed with a bore 8b through which the motor rotational shaft 7 extends, and the bore 8b has a taper bore portion which is engaged by the taper portion of the rotational shaft 7. The input rotational shaft 8 is held on the pointed portion 7a of the rotational shaft 7 of the electric motor 1 by a nut 23. The pointed end portion 7a of the rotational shaft 7 is secured to the input rotational shaft 8 by means of a semicircular key 24. Such construction permits the shaft diameter of the pointed end portion 8a of the input rotational shaft 8 to be less than the shaft diameter of the motor rotational shaft 7, and accordingly the number of teeth of the pinion 22 can be reduced as compared with the case that a gear is directly mounted on the drive shaft 7, and even in the case that a motor with a relatively larger shaft is employed, a predetermined primary reduction ratio can be obtained. Three spur gears 25 meshing with the pinion 22 are connected to three input crank shafts 30, respectively, to be described hereinafter.

The planetary reduction gear 21 comprises an internal gear 28 nonrotatably mounted on a cylindrical support member 4, a pair of external gears 29 and 29 each meshing with the internal gear 28, and three input crank shafts 30 each of which engages with the external gears 29 and 29 and serves as an eccentric input shaft to eccentrically rotate the external gears 29 and 29. The internal gear 28 comprises a pin gear consisting of a plurality of pin teeth 31 and has more teeth than the external gear 29 by one. Designated by reference numeral 33 is a circular plate portion 33, and the circular plate portion 33 forms a front end portion of the planetary reduction gear 21 and arranges circumferentially equiangularly and supports the input crank shafts 30 through bearings 34. A block member designated by reference numeral 35 is formed at its central portion with an axially, cylindrical-shaped bore 37 through which the input rotational shaft 8 extends. Similarly, the external gears 29 and 29 and, the circular plate 33 are also formed at their central portions with bores 29f, 29f and 33a respectively. The block member 35 is formed at its rear end portion 35c with a concave 36 opposed to the flange portion 10a of the shaft 10. In the space defined by the concave 36 and the flange 10a is accommodated the primary reduction gear 20. The three input crank shafts 30 are circumferentially equiangularly arranged and rotatably supported through bearings 41 by the block member 35. Extended portions 30a of the input crank shafts 30 project into the concave 36 and are secured to the spur gears 25.

Each of the input crank shafts 30 supported by the circular plate 33 and the block member 35 has at its intermediate portion a pair of crank portions 42, the phase difference therebetween being 180°. Each of the crank portions 42 is adapted to eccentrically rotate the external gears 29 through the bearing 43. The aforementioned circular plate portion 33 and the block member 35 as a whole constitute a support member 44. The circular plate portion 33, the block member 35 and the flange portion 10a are held in fast assembled relationship by a plurality of bolts 46 and nuts 47.

Also, the bar members 60 comprise the aforementioned bolt 46, first taper pin 61 and second taper pin 63, and hold the pair of flanges 32 and the second arm 12 in fast assembled relationship. The remaining construction is substantially identical to the first embodiment.

Rotation of the electric motor 1 is transmitted through the rotational shaft 7 and the input shaft 8 to the pinion 22 of the primary reduction gear 20, and reduced by the primary reduction gear 20. The output of the primary reduction gear 20 is inputted to the input crank shafts 30 of the planetary reduction gear 21 by means of the spur gears 25. Thereafter, the rotation transmitted to the input crank shafts 30 are further reduced by the external gears 29a and 29b which are caused to rotate eccentrically by the rotations of the input crank shafts 30, and the internal gear 28 meshing with the external gears 29a and 29b and having more teeth than the external gears 29 by one. The slow rotational motion of the external gears 29 is transmitted from the support member 44 serving as a carrier to the shaft 10, so that the second robot arm 12 is rotated.

In the embodiment constructed in accordance with the present invention, the number of rotations of the electric motor 1 which is in normal operation is in the range of between 1 and 1000 rpm, the reduction gear ratio $i_1$ of the primary reduction gear 20 is ⅓, the reduction gear ratio $i_2$ of the planetary reduction gear 21 is 1/40, the total reduction gear ratio i of the reduction gear apparatus 3 is 1/120, and the natural torsional frequency $f_o$ of the drive system comprising the electric motor 1, the reduction gear means 3, the second robot arm 12 and the load associated with the second robot arm 12 is approximately 8.4 hertz. Accordingly, the electric motor 1 has within the normal operational region (0 to 1000 rpm) the number of rotations (500 rpm corresponding to 8.4 hertz) corresponding to the natural torsional frequency $f_o$ of the drive system of the industrial robot. Also, the primary reduction gear 20 has the reduction gear ratio $i_1$ (⅓) so that the maximum of the number of rotations (16.7 revolution per second or 1000 rpm) of the electric motor 1 which is in normal operation is reduced less than the natural torsional frequency $f_o$ (5.6 revolution per second) of the drive system.

The rotational spring constant $K_1$ of the reduction gear 40 is about 37.5 kg m/minute. The operation and the vibration characteristic of this embodiment are substantially equal to the aforementioned first embodiment of the present invention.

An embodiment of an articulation drive apparatus according to the present invention, which is used in an industrial robot 65 shown in FIG. 9, will hereinafter be described in conjunction with the drawings.

Figure 9:
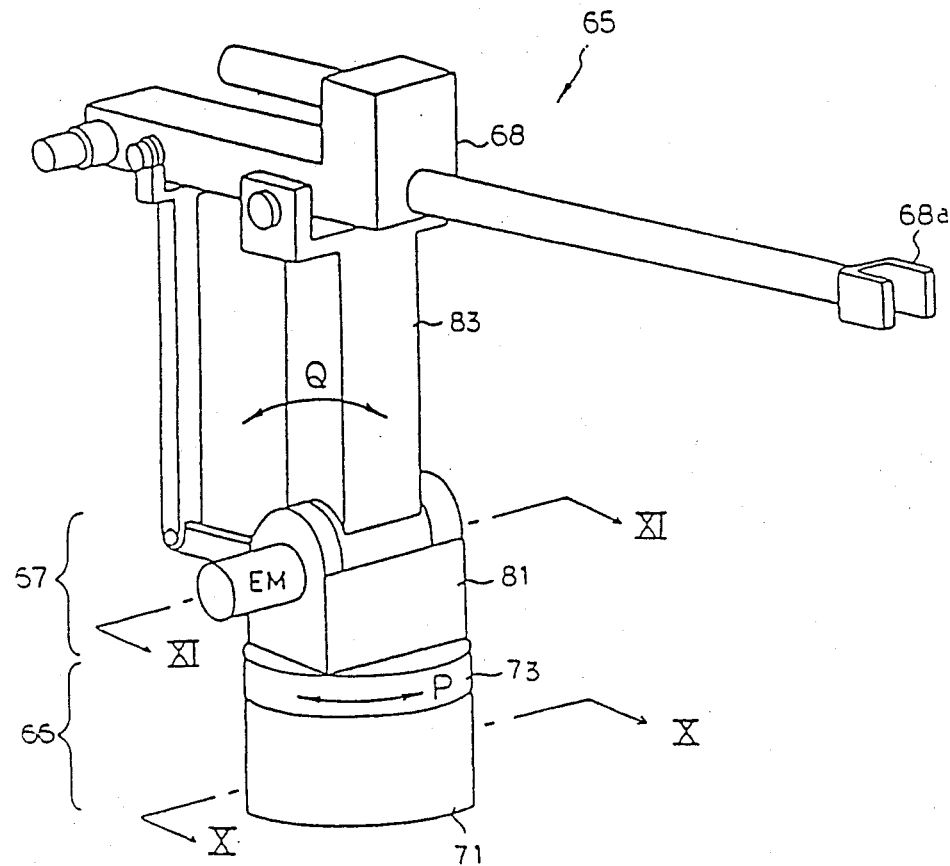
FIG. 9 is a schematic view of an industrial robot in which the articulation drive apparatus according to the present invention is used.

In FIG. 9, the industrial robot 65 comprises a first articulation 66, a second articulation 67 connected to the first articulation 66, a first arm 83 connected to the second articulation 67 and a second arm 68. The first articulation 66 rotates a swivel member 73 arranged above a post 71 in the directions indicated by arrow P and the second articulation 67 rotates the first arm 83 arranged above a bracket 81 nonrotatably mounted on the swivel member 73 in the directions indicated by arrow Q, thereby permitting three dimensional movement of an end portion 68a of the second arm 68.

Figure 10:
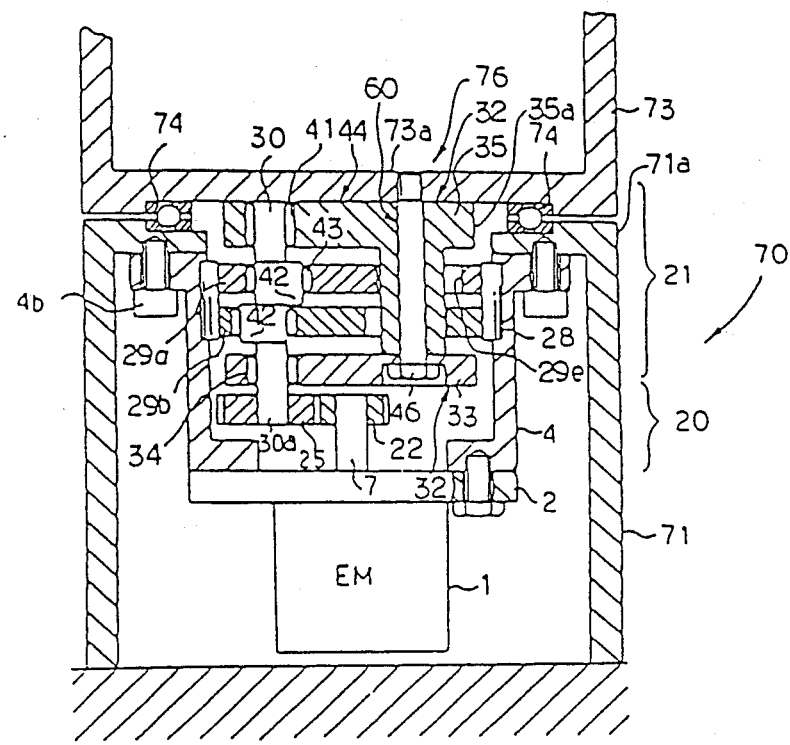
FIG. 10 is a cross sectional view, partly broken away, of a third embodiment according to the present invention used in a first articulation shown in FIG. 9.

FIG. 10 shows a third embodiment of the present invention, the portions substantially identical in construction to the aforementioned first embodiment being designated by like reference numerals.

In FIG. 10, designated by reference numeral 70 is a reduction gear apparatus, and the reduction gear apparatus 70 is enclosed within a cylindrical post 71 which serves as a first member in the first articulation 66 of the industrial robot shown in FIG. 9. The reduction gear apparatus 70 comprises a primary reduction gear 20 of the parallel shaft type which is connected to an electric motor 1 and a secondary planetary reduction gear 21 connected to the primary reduction gear 20. In the planetary reduction gear 21 are provided two external gears (29a and 29b) which are spaced apart 180° in phase.

A flange 2 of the electric motor 1 is secured through a cylindrical member 4 to the post 71 by means of a plurality of bolts 4b. A generally vertical, rotational shaft 7 arranged above the electric motor 1 is fixedly connected to a pinion 22 of the primary reduction gear 20, and three spur gears 25 meshing with the pinion 22 are fixedly connected to extended portions 30a of three input crank shafts 30, to be described hereinafter. The planetary reduction gear 21 is arranged above the primary reduction gear 20 and comprises an internal gear 28 mounted in the cylindrical member 4, a pair of external gears 29a and 29b (which are hereinafter referred to as 29) meshing with the internal gear 28, and three input crank shafts 30 each of which engages with the external gears 29 and serves as an eccentric input shaft to eccentrically rotate the external gears 29. The input crank shafts 30 are rotatably supported through a bearing 34 to a circular plate portion 33 forming a lower end portion of the planetary reduction gear 21, and is rotatably supported through a bearing 41 to a block member 35 which is passed through bores formed in the upper end portion of the planetary reduction gear 21 and equiangularly formed in the external gears 29. The block member 35 and the circular plate portion 33 constitute the support member (carrier) 44, and a pair of flanges 32 comprising a flange portion 35a of the block member and the circular plate portion 33, and a bottom portion 73a of the cylindrical-shaped swivel member 73 which is arranged above the post 71 and serves as a second member, are held in fast assembled relationship by the bar member 60 (only the bolt 46 is shown). Between the bottom portion 73a and an upper portion 71a of the post 71 is interposed a bearing 74, and the swivel member 73 rotates as the support member (carrier) 44 rotates. The construction, operation and vibration characteristic of the portions which are not described are substantially identical to the first embodiment, and therefore the description will be omitted.

Figure 11:
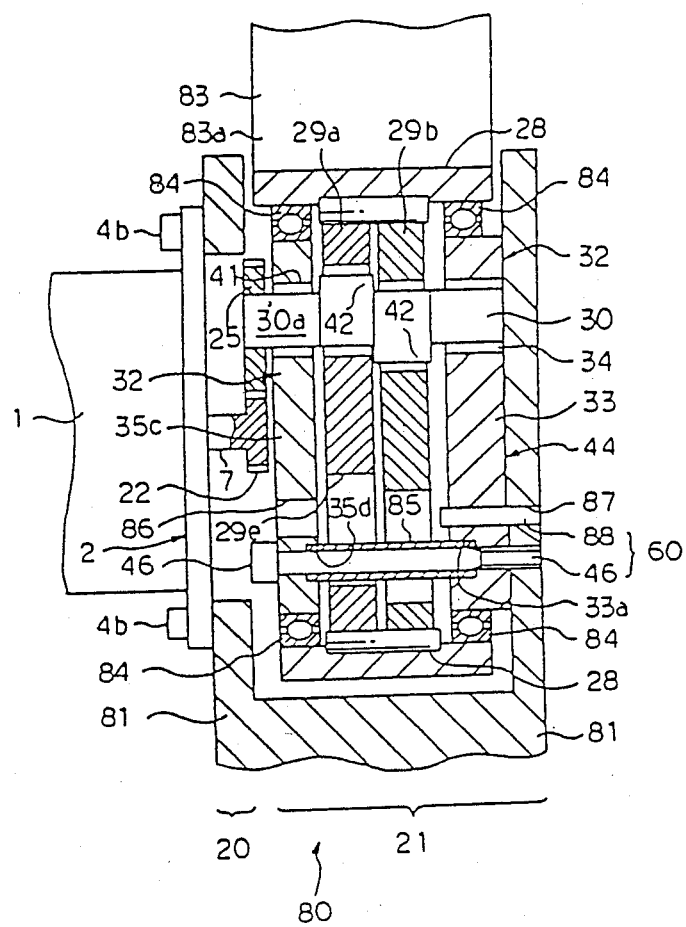
FIG. 11 is a cross sectional view, partly broken away, of a fourth embodiment according to the present invention used in a second articulation shown in FIG. 9.

FIG. 11 shows a fourth embodiment of the present invention, and the portion substantially identical in construction to the aforementioned first embodiment will be described with like reference numerals.

In FIG. 11, designated by reference numeral 80 is a reduction gear apparatus which is used in the second articulation 67 of the industrial robot shown in FIG. 9. A box-shaped bracket 81 serving as a first member is arranged above and connected to the swivel member 73 of the aforementioned first articulation 66. The reduction gear apparatus 80 comprises a primary reduction gear 20 of the parallel shaft type connected to an electric motor 1 and a secondary planetary reduction gear 21 connected to the primary reduction gear 20. A flange 2 of the electric motor 1 is secured to the bracket 81 by means of a plurality of bolts 4b, a rotational shaft 7 of the electric motor 1 is connected to a pinion 22 of the primary reduction gear 20, and three spur gears 25 meshing with the pinion 2 are connected to extended portions 30a of three input crank shafts 30, respectively, to be hereinafter described. A front end portion of the input crank shaft 30 of the planetary reduction gear 21 is rotatably supported through a bearing 41 by a plate-shaped block member 35c, and the rear end portion is rotatably supported through a bearing 34 by a circular plate portion 33. The plate-shaped block member 35c and the circular plate portion 33 constitute a pair of flange 32. A plurality of sleeves 85 fits at their one ends in grooves formed equiangularly in one flange 32 and at the other ends in grooves formed equiangularly in the other flange 32, and extend through bores 29e. The sleeves 85 not only hold the pair of flanges 32 properly in the axial and circumferential directions but also serve as a pin. The block member 35c, sleeves 85 and circular plate portion 33 constitute the support member 44, and these are secured to the bracket 81 by means of the bar members 60 comprising the blots 41. Each of bores 86 formed circumferentially equiangularly in the block member 35c is a tool-bore for the working and assembly of pin bores 87 formed circumferentially equiangularly in the circular plate portion 33. Pins 88 fit the pin bores 87 and hold the circular plate portion 33 and the bracket 81 in position. The internal gear 28 of the planetary reduction gear 21 is freely rotatably supported through bearings 84 on the circumference of the support member 44. The internal gear 28 is integrally connected to an end portion 83a of the first arm 83 serving as a second member.

The rotation of the electric motor 1 is transmitted through the rotational shaft 7 to the pinion 22 of the primary reduction gear 20, and reduced by the primary reduction gear 20. The output of the primary reduction gear 20 is inputted through the spur gears 25 to the input crank shafts 30 of the planetary reduction gear 21. Thereafter, the reduced rotation is further reduced by a pair of the external gears 29a and 29b (which will hereinafter be referred to as 29) which is caused to eccentrically rotate by the rotation of the input crank shafts 30, and by the internal gear 28 meshing with this external gears 29 and having more teeth than the external gears 29, and the slow rotational motion of the internal gear 28 causes the second arm 83 to rotate. The portions which are not described are substantially identical in construction, operation and vibration characteristic to the aforementioned first embodiment, and denoted by like reference numerals for avoiding the description.

Figure 12:
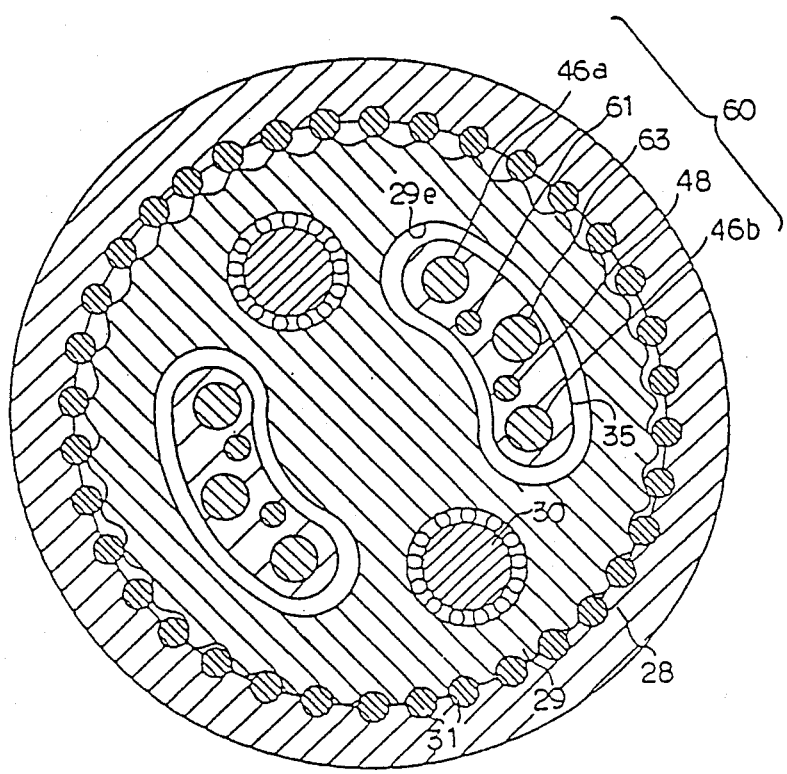
FIG. 12 is a cross sectional view, partly broken away, of a fifth embodiment of the present invention.

FIG. 12 shows a fifth embodiment of the present invention. The construction substantially identical to the first embodiment will hereinafter be described with like reference numerals.

This fifth embodiment is characterized in that input crank shafts 30 comprises two input crank shaft 30 and in that a pair of flanges 32 not shown and a flange portion 10a are integrally connected with each other by five bar-shaped members 60 passing through arcuate-shaped through bores 29e formed circumferentially equiangularly in external gears 29. Two first bolts 46a and 46b secures the pair of flanges 32 to the flange portion 10a, and a small bolt 48 holds a circular plate portion 32 not shown and a block member 35 in assembled relationship. A first pin 61 holds the circular plate portion 33 and a front end portion 35b in position, and a second pin 63 holds the block member 35 and the flange portion 10a in position. The portions not mentioned above are substantially identical to the first embodiment.

It should be noted that, in the present invention, the reduction gear ratio of the primary reduction gear may be a value which reduces the maximum of the number of rotations per second of the electric motor to a frequency equivalent at which resonance phenomenon occurs (in the vicinity of "torsional oscillating frequency"), that is to say, a frequency equivalent slightly less than the natural frequency of the drive system. For instance, in the case that the natural torsional frequency $f_o$ of the drive system is 5 to 9 Hz, when the maximum of the number of rotations of the electric motor is 1000 rpm and the total reduction gear ratio i is 1/60 to 1/320, the resonance phenomenon can be transferred outside the normal operational region of the electric motor by the minimum reduction gear ratio $i_1$ of the first stage having about 1/1.9 to about 1/6 and the reduction gear ratio $i_2$ of the second stage having about 1/25 to about 1/60. Also, in the case that the natural torsional frequency $f_o$ of the drive system is 5 to 9 Hz, when the maximum of the number of rotations of the electric motor is 2000 rpm and the total reduction gear ratio i is 1/110 to 1/320, an articulation apparatus of a robot preventing resonance phenomenon can be obtained by the minimum reduction gear ratio $i_1$ of the first stage having about 1/3.7 to about 1/6.7 and the reduction gear ratio $i_2$ of the second stage having about 1/25 to about 1/60. Also, in the case that the natural torsional frequency $f_o$ of the drive system is 5 to 9 Hz, when the maximum of the number of rotations of the electric motor is 4000 rpm and the total reduction gear ratio i is 1/210 to 1/640, the minimum reduction gear ratio $i_1$ of the first stage may be about 1/7.4 to about 1/13.3 and the reduction gear ratio $i_2$ of the second stage may be about 1/30 to about 1/60. Also, in the case that the natural torsional frequency $f_o$ of the drive system is 10 to 15 Hz, when the maximum of the number of rotations of the electric motor is 1000 rpm and the total reduction gear ratio i is 1/80 to 1/300, the resonance phenomenon can be transferred outside the normal operational region of the electric motor by the minimum reduction gear ratio $i_1$ of the first stage having about 1/1.5 to about 1/4 and the reduction gear ratio $i_2$ of the second stage having about 1/25 to about 1/60. Also, in the case that the natural torsional frequency $f_o$ of the drive system is 10 to 15 Hz, when the maximum of the number of rotations of the electric motor is 4000 rpm and the total reduction gear ratio i is 1/125 to 1/600, the minimum reduction gear ratio $i_1$ of the first stage may be about 1/4.5 to about 1/10 and the reduction gear ratio $i_2$ of the second stage may be about 1/30 to about 1/100.

From the foregoing description, it will be seen that, in accordance with present invention there is provided an articulation drive apparatus of an industrial robot wherein the resonance phenomenon of the drive system of the robot can be transferred outside the normal operational region and which is structurally simple, light in weight and stands a relatively larger load.

INDUSTRIAL APPLICABILITY

An articulation drive apparatus of an industrial robot according to the present invention is applicable to articulation drive of a robot for a manufacturing industry, mining industry, medical industry, atomic industry and the like, and particularly to articulation drive apparatuses of robots for production process, precision inspection and high accuracy operation as the articulation drive apparatus of the present invention is small and light in weight and the drive system has no resonance vibration.

We claim:

1. An articulation drive apparatus of an industrial robot comprising
a first member of the robot,
a second member of the robot freely rotatably supported on the first member, and
a reduction gear apparatus for reducing rotation of an electric motor integrally connected to the first member and transmitting the reduced rotation to the second member,
said reduction gear apparatus (3) comprising a primary reduction gear (20) having a predetermined reduction ratio $i_1$ for reducing the number of rotations of said electric motor (1) and a secondary planetary reduction gear (21) having a predetermined reduction ratio $i_2$ for further reducing the number of rotations of output of said primary reduction gear (20), said planetary reduction gear (21) comprising an eccentric input shaft (30) to which output of said primary reduction gear (20) is inputted, an external gear (29, 29a, 29b) engaging with said eccentric input shaft (30) and driven to eccentrically rotate by the rotation of said eccentric input shaft (30), an internal gear (28) meshing with said external gear (29, 29a, 29b) and having more teeth than said external gear (29, 29a, 29b) by one and a pair of flanges (32) arranged in opposite sides of said external gears (29, 29a, 29b) and supporting said eccentric input shaft (30), said second member (12) and said flange (32) adjacent said second member being connected by a pin inserted from a bore formed in said flange adjacent said electric motor and a bore formed in said external gear (29, 29a,29b), said secondary reduction gear and said second member being connected by a bolt passing through said pair of flanges (32).

2. An articulation drive apparatus as set forth in claim 1, which further comprises a total reduction ratio of said primary and secondary reduction gears being in the range $1/60 > i_1 \times i_2 > 1/200$.

3. A robot arm drive apparatus of an industrial robot comprising:
  an electric motor having a drive shaft;
  a first robot member having said electric motor mounted thereon;
  a second robot member rotatably supported on said first robot member; and
  reduction gear means for reducing rotation of said electric a motor and then transmitting the reduced rotation to said second robot member;
  said reduction gear means comprising a planetary reduction gear and furthermore an additional reduction gear which is purposely provided so that the number of rotations of said electric motor, at which the resonance of a drive system comprising said electric motor, said second robot member and said reduction gear means occurs, is shifted from a predetermined operational region of said electric motor;
  said secondary reduction gear comprising an input shaft having a cam surface and connected with said primary reduction gear, an external gear, an internal gear held in mesh with said external gear and different in number of teeth from said external gear, the external gear being connected to said cam surface of said input shaft in such a manner that differential motion between said external gear and said internal gear is developed.

4. A robot arm drive apparatus of an industrial robot comprising:
  an electric motor having a drive shaft;
  a first robot member having said electric motor mounted thereon;
  a second robot member rotatably supported on said first robot member; and
  reduction gear means for reducing rotation of said electric motor and then transmitting to said second robot member;
  said reduction gear means comprising a primary reduction gear for reducing said rotation of said electric motor and a secondary, planetary reduction gear for further reducing rotation of output of said primary reduction gear;
  said primary reduction gear having a predetermined reduction ratio $i_1$;
  said secondary reduction gear comprising an input shaft having a cam surface and connected with said primary reduction gear, an external gear and an internal gear held in mesh with said external gear and different in number of teeth from said external gear, the external gear being connected to said cam surface of said input shaft in such a manner that differential motion between said external gear and said internal gear is developed;
  said predetermined reduction ratio $i_1$ of said primary reduction gear being given by the following equation $$0.1 < i_1 < 60 f_o / T_f N_{max}$$

wherein $f_o$ indicates the natural frequency of a drive system comprising said electric motor, said second robot member and said reduction gear means, $T_f$ indicates the number of torque fluctuations per one revolution in said input shaft of said secondary reduction gear, and $N_{max}$ indicates the maximum number of rotations (rpm) of said electric motor in a predetermined operational region.

5. A robot arm drive apparatus as set forth in claim 4, in which said predetermined operational region is a motor normal operational region.

6. A robot arm drive apparatus as set forth in claim 4, in which said predetermined operational region is an accurate control region of the robot arm drive apparatus.

7. A robot arm drive apparatus as set forth in claim 4, in which said secondary reduction gear comprises a harmonic reduction gear having a reduction ratio $i_2$ so that $i_1 \times i_2$ is in the range of 1/320 to 1/80.

8. A root arm drive apparatus as set forth in claim 7, in which said number of torque fluctuations $T_f$ is 2.

9. A robot arm drive apparatus as set forth in claim 4, in which said secondary reduction gear comprises an eccentric-rotation type planetary differential reduction gear.

10. A robot arm drive apparatus as set forth in claim 9, in which said number of torque fluctuations $T_f$ is 1.

* * * * *